United States Patent
Kim

(10) Patent No.: US 11,511,410 B2
(45) Date of Patent: Nov. 29, 2022

(54) ARTIFICIAL INTELLIGENCE (AI) ROBOT AND CONTROL METHOD THEREOF

(71) Applicant: LG ELECTRONICS INC., Seoul (KR)

(72) Inventor: Namgeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 551 days.

(21) Appl. No.: 16/490,207

(22) PCT Filed: Jun. 17, 2019

(86) PCT No.: PCT/KR2019/007263
§ 371 (c)(1),
(2) Date: Aug. 30, 2019

(87) PCT Pub. No.: WO2020/256161
PCT Pub. Date: Dec. 24, 2020

(65) Prior Publication Data
US 2021/0402589 A1    Dec. 30, 2021

(51) Int. Cl.
*G05B 19/04* (2006.01)
*G05B 19/18* (2006.01)
(Continued)

(52) U.S. Cl.
CPC ........... *B25J 9/0003* (2013.01); *B25J 11/001* (2013.01); *B25J 11/0015* (2013.01); *B25J 13/003* (2013.01); *B25J 19/023* (2013.01)

(58) Field of Classification Search
CPC .... B25J 11/001; B25J 11/0015; B25J 13/003; B25J 19/023; B25J 9/0003
See application file for complete search history.

(56) References Cited

U.S. PATENT DOCUMENTS 6,584,376 B1 * 6/2003 Van Kommer ...... G05D 1/0022
379/90.01
2002/0081937 A1 * 6/2002 Yamada ................ A63H 11/00
446/175
(Continued)

FOREIGN PATENT DOCUMENTS

JP    2018-087847    6/2018
JP    2018-152810    9/2018
(Continued)

OTHER PUBLICATIONS

International Search Report dated Mar. 13, 2020 issued in International Application No. PCT/KR2019/007263.

*Primary Examiner* — Harry Y Oh
(74) *Attorney, Agent, or Firm* — KED & Associates, LLP

(57) ABSTRACT

Disclosed is a method of controlling a robot, comprising: switching to a surrounding environment concentration mode according to a sound of surrounding environment in a display off mode; searching a user in the surrounding environment concentration mode and switching to a user concentration mode when the user is searched; switching to a user conversation mode from the user concentration mode according to a sound received from the user; and entering the display off mode again after passing through a play alone mode, when the user is not searched in the surrounding environment concentration mode. Accordingly, the robot can operate in an optimal mode according to the change of the surrounding environment by setting various modes of the robot.

20 Claims, 13 Drawing Sheets

(51) Int. Cl.
*B25J 9/00* (2006.01)
*B25J 11/00* (2006.01)
*B25J 13/00* (2006.01)
*B25J 19/02* (2006.01)

(56) References Cited

U.S. PATENT DOCUMENTS

| | | |
|---|---|---|
| 2002/0161480 A1 | 10/2002 | Kakutani et al. |
| 2007/0185980 A1* | 8/2007 | Abraham ............ H04L 41/0886 709/222 |
| 2007/0192910 A1* | 8/2007 | Vu ........................... B25J 19/06 901/17 |
| 2017/0125008 A1 | 5/2017 | Maisonnier et al. |
| 2018/0370039 A1* | 12/2018 | Nakagome ............ G06V 40/174 |
| 2019/0138019 A1* | 5/2019 | Hayashi ................ G05D 1/0088 |
| 2019/0373096 A1* | 12/2019 | Shim ........................ G06F 1/169 |
| 2020/0342880 A1* | 10/2020 | Pascovici ................ G10L 15/26 |

FOREIGN PATENT DOCUMENTS

| | | |
|---|---|---|
| KR | 10-2002-0067669 | 8/2002 |
| KR | 10-2005-0062850 | 6/2005 |
| KR | 10-2009-0080448 | 7/2009 |
| KR | 10-2017-0027705 | 3/2017 |

* cited by examiner

ARTIFICIAL INTELLIGENCE (AI) ROBOT AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2019/007263, filed Jun. 17, 2019, whose entire disclosure is hereby incorporated by reference.

TECHNICAL FIELD

The present invention relates to an artificial intelligence home robot and a control method of a smart home system including the same. More particularly, the present invention relates to a home robot capable of providing a human-friendly service to a user in various modes using an artificial home robot, and a control method thereof.

BACKGROUND ART

Conventionally, home appliances, e.g., a washing machine, an air conditioner, a cleaner, and the like used in a certain space such as a home or an office, individually perform their own functions and operations.

For example, a refrigerator stores food, a washing machine treats laundry, an air conditioner adjusts room temperature, and a cooking appliance serves to cook food.

In recent years, with the development of various communication technologies, a number of home appliances are networked by wired/wireless communication.

Home appliances constituting a network may transmit data from one device to other device, and may check information of other device by one device.

In addition, by configuring a network including a smart device such as a portable terminal, a user can check and control information of home appliances anytime, anywhere by using his smart device.

The network of devices inside home may be referred to as a smart home.

The related art (Korean Application No. 10-2003-0093196, filed Dec. 18, 2003) in related with the smart home technology constitutes a home network including a washing machine, and the like.

In the related art, when a certain time is elapsed after washing is terminated, the washing machine itself communicates with a user based on the presence of laundry and the humidity, and subsequent action is performed according to the result. Therefore, damage due to long-term neglect of laundry can be prevented.

That is, after the laundry is terminated, the washing machine transmits information on neglect of laundry and an inquiry message asking whether to proceed with subsequent action, and when a response is received, the subsequent action is performed according to the response.

Like the related art, the conventional smart home technology is remained at the level of providing or controlling information of a specific device to the user through the portable terminal even when the user is in the home. In addition, there is an inconvenience that the user should operate the portable terminal every time.

Meanwhile, robots have been developed for industrial use and have been a part of factory automation. In recent years, the application of robots has been further expanded, and medical robots, aerospace robots, and the like have been developed, and home robots that can be used in general homes have also been manufactured.

Such home robots are intended to drive a variety of home appliances.

However, such a home robot is not easy to detect and determine the current state of the user, and scenarios for various situations are not formed.

Therefore, sense of distance or repulsion may occur when the user desires to be friendly with the home robot.

DISCLOSURE

Technical Problem

An object of the present invention is to provide a home robot operating in an optimal mode according to change in the surrounding environment by setting various modes of the home robot, and a control method of the same.

An object of the present invention is to provide a home robot capable of reducing power consumption and minimizing a connection with a server by selectively driving only a specific device according to a changed condition of the environment in a display off state so as to switch to a corresponding mode, and a control method of the same.

Technical Solution

In an aspect, there is provided a method of controlling a home robot, including: switching to a surrounding environment concentration (or second) mode according to a sound of surrounding environment in a display off (or first) mode; searching a user in the surrounding environment concentration (or second) mode and switching to a user concentration (or third) mode when the user is searched; switching to a user conversation (or fourth) mode from the user concentration (or third) mode according to a sound received from the user; and entering the display off (or first) mode again after passing through a play alone (or fifth) mode, when the user is not searched in the surrounding environment concentration (or second) mode.

In the display off mode, only a voice input unit is turned on and other module is controlled to be turned off.

In the surrounding environment concentration mode, all of a display, the voice input unit, and an image acquisition unit are turned on to search whether there is a user from the surrounding environment.

The switching to the user conversation mode from the surrounding environment concentration mode includes recognizing the user by the image acquisition unit or physically applying a stimulus to the home robot.

The user conversation mode is entered when a call word or a command for the home robot is received.

In the play alone mode, an operation is controlled in such a manner that a plurality of motions are performed randomly.

In the play alone mode, a plurality of motions that can express respective emotions are set, and the respective emotions are expressed by combining the display, utterance, motion, and light emitting.

A dozing mode is performed between the play alone mode and the display off mode.

If there is no stimulus for a certain time in the surrounding environment concentration mode, when illuminance of the surrounding environment is equal to or less than a threshold value after reading the illuminance, the display off mode is directly entered.

In the display off mode, the surrounding environment concentration mode or the user conversation mode is selectively entered according to a received sound type.

In an aspect, there is provided a home robot, including: a body configured to form an inner storage space; a support portion configured to be disposed below the body and support the body; a display configured to be able to display an image; a head configured to be positioned above the body and have the display disposed in a front surface; a sound output unit including a speaker to utter voice; a voice input unit including a plurality of microphones (MIC) through which a voice signal is received; and a controller controls to switch from a display off mode to a surrounding environment concentration mode or a user conversation mode according to a sound of surrounding environment, search a user in the surrounding environment concentration mode, switch to the user concentration mode when the user is searched, and enter the display off mode again after passing through a play alone mode when the user is not searched.

In the display off mode, the controller turns on only the voice input unit and controls other module to be turned off.

In the surrounding environment concentration mode, all of the display, the voice input unit, and an image acquisition unit are turned on to search whether there is a user from the surrounding environment.

The switching to the user conversation mode from the surrounding environment concentration mode is performed when the user is recognized by the image acquisition unit The user conversation mode is performed when a call word or a command for the home robot is received.

In the play alone mode, an operation is controlled in such a manner that a plurality of motions are performed randomly.

In the play alone mode, a plurality of motions that can express respective emotions are set, and the respective emotions are expressed by combining the display, utterance, motion, and light emitting.

A dozing mode is performed between the play alone mode and the display off mode.

If there is no stimulus for a certain time in the surrounding environment concentration mode, when illuminance of the surrounding environment is equal to or less than a threshold value after reading the illuminance, the display off mode is directly entered.

In the display off mode, the surrounding environment concentration mode or the user conversation mode is selectively entered according to a received sound type.

Advantageous Effects

According to at least one of the embodiments of the present invention, various modes of the home robot may be set to operate in an optimal mode according to a change in the surrounding environment.

In addition, power consumption can be reduced and a connection with a server can be minimized by selectively driving only a specific device according to a changed condition of surrounding environment in a display off state to switch to a corresponding mode.

MODE FOR INVENTION

Figure 1:
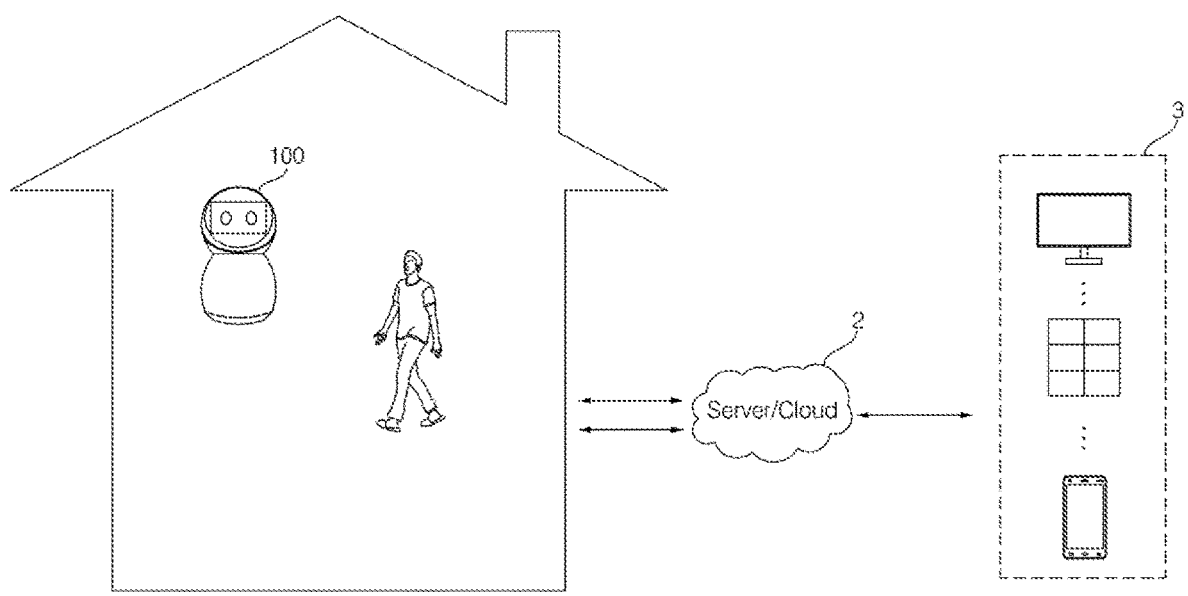
FIG. 1 is a configuration diagram of a smart home system including a home robot according to an embodiment of the present invention.

Prior to a detailed description of the present invention, terms and words used in the specification and the claims shall not be interpreted as commonly-used dictionary meanings, but shall be interpreted as to be relevant to the technical scope of the invention based on the fact that the inventor may property define the concept of the terms to explain the invention in best ways. Therefore, the embodiments and the configurations depicted in the drawings are illustrative purposes only and do not represent all technical scopes of the embodiments, so it should be understood that various equivalents and modifications may exist at the time of filing this application. Some constituent elements shown in the drawings may be exaggerated, omitted or schematically drawn for the purpose of convenience or clarity. In addition, the size of elements does not utterly reflect an actual size. Accordingly, the present invention is not limited to a relative size and interval shown in the accompanying drawings.

Figure 2:
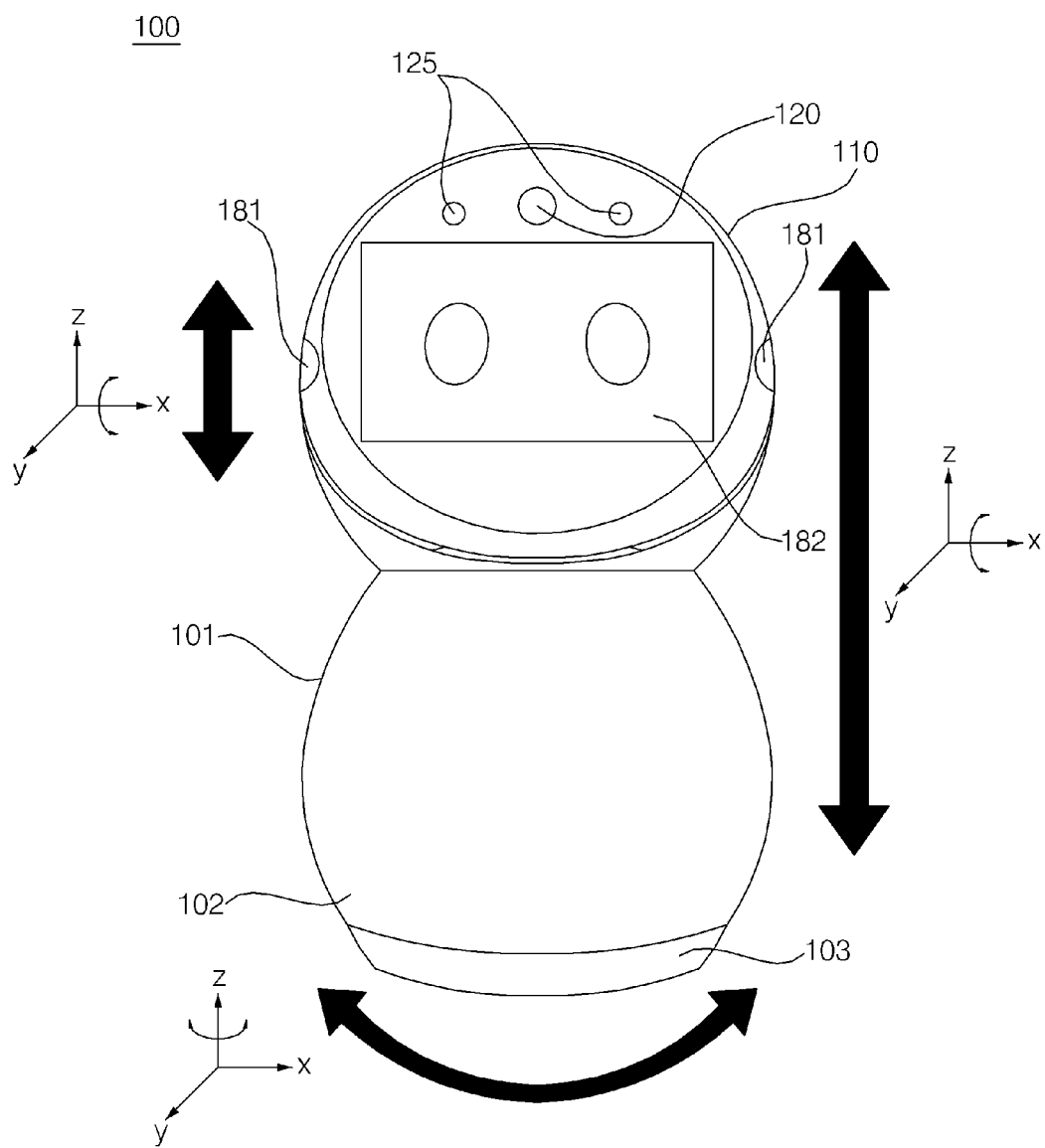
FIG. 2 is a front view showing an outer shape of a home robot according to an embodiment of the present invention.
Figure 3:
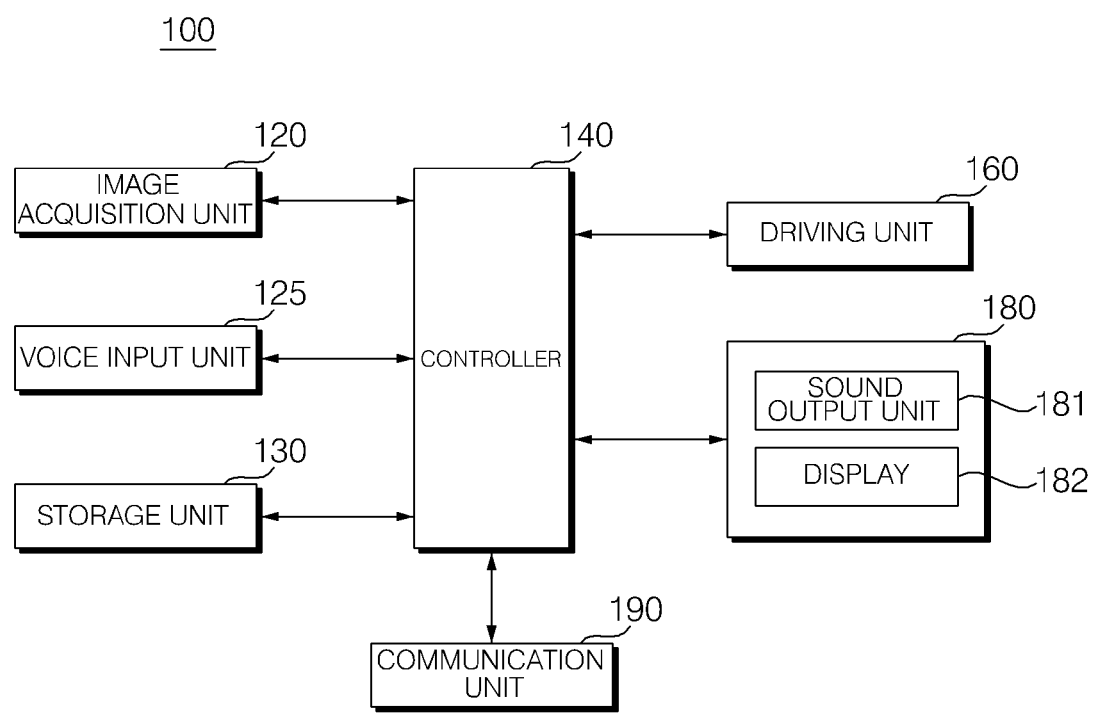
FIG. 3 is an example of a schematic internal block diagram of a home robot according to an embodiment of the present invention.

FIG. 1 is a block diagram of an artificial intelligence robot system according to an embodiment of the present invention, FIG. 2 is a view of a home robot 100 of FIG. 1, and FIG. 3 is an example of a schematic internal block diagram of a home robot according to an embodiment of the present invention.

Referring to FIGS. 1 to 3, the robot system according to an embodiment of the present invention may include at least one robot 100 to provide a service at a prescribed place such as a house. For example, the robot system may include a home robot 100 that interacts with a user in a home or the like and provides various entertainment to the user. In addition, such a home robot 100 may provide a payment service by performing an online shopping or an online order according to user's request.

Preferably, the robot system according to an embodiment of the present invention may include a plurality of artificial intelligence home robots 100 and a server 2 for managing and controlling the plurality of artificial intelligence home robots 100. The server 2 may remotely monitor and control the state of the plurality of robots 100, and the robot system may provide a more effective service by using the plurality of home robots 100.

The plurality of home robots 100 and the server 2 may be provided with a communication means (not shown) that support one or more communication standards to communicate with each other. In addition, the plurality of home robots 100 and the server 2 may communicate with a PC, a mobile terminal, and another external server 2.

For example, the plurality of robots 100 and the server 2 may be implemented to achieve a wireless communication by using a wireless communication technology such as IEEE 802.11 WLAN, IEEE 802.15 WPAN, UWB, Wi-Fi, Zigbee, Z-wave, Blue-Tooth, or the like. The robot 100 may be changed depending on the communication method of the other device or the server 2 desired to communicate with.

In particular, the plurality of home robots 100 may implement wireless communication with other robots 100 and/or the server 2 through a 5G network. When the home robot 100 communicates wirelessly through a 5G network, real time response and real time control can be achieved.

The user may check information related to the robots 100 in the robot system through the user terminal 3 such as a PC or a mobile terminal.

The server 2 may be implemented as a cloud server 2 so that the cloud server 2 may be linked to the robot 100 to monitor and control the robot 100 and remotely provide various solutions and contents.

The server 2 may store and manage information received from the robot 100 and other devices. The server 2 may be a server 2 provided by a manufacturer of the robot 100 or a company to which the manufacturer entrusted a service. The server 2 may be a control server 2 that manages and controls the home robot 100.

The server 2 may collectively control the home robot 100 in the same manner, or may control each individual robot 100. Meanwhile, the server 2 may be configured by a plurality of servers to which information and functions are distributed, or may be configured by a single integrated server.

The home robot 100 and the server 2 may be provided with a communication means (not shown) that support one or more communication standards, and may communicate with each other.

The artificial intelligence home robot 100 may transmit data related to space, object, and usage to the server 2.

Here, the data related to the space, object may be data related to the recognition of the space and the object recognized by the robot 100, or may be image data related to the space and the object acquired by the camera.

In some embodiments, the home robot 100 and the server 2 may include artificial neural network (ANN) in the form of software or hardware learned to recognize at least one of an attribute of an object such as a user, a voice, an attribute of a space, an obstacle, and the like.

According to an embodiment of the present invention, the robot 100 and the server 2 may include a deep neural network (DNN) such as a convolutional neural network (CNN), a recurrent neural network (RNN), a deep belief network (DBN), and the like, which are learned by deep learning. For example, the controller 140 of the robot 100 may be equipped with a deep neural network structure (DNN) such as a convolutional neural network (CNN).

After enabling the deep neural network (DNN) to learn based on data received from the home robot 100, data inputted by a user, and the like, the server 2 may transmit an updated deep neural network (DNN) structure data to the home robot 100. Accordingly, the deep neural network (DNN) structure of the artificial intelligence provided in the home robot 100 may be updated.

In addition, the usage-related data is data acquired according to the use of the home robot 100, and may correspond to usage history data and a detection signal acquired by the sensor unit 110.

The learned deep neural network structure (DNN) may receive input data for recognition, recognize attributes of people, object, and space contained in the input data, and output the result.

In addition, the learned deep neural network structure (DNN) may receive input data for recognition, and analyze and learn the usage-related data of the robot 100 to recognize the usage pattern, use environment, and the like.

Meanwhile, data related to space, object, and usage may be transmitted to the server 2 through the communication unit 190.

After enabling the deep neural network (DNN) to learn based on received data, the server 2 may transmit the updated deep neural network (DNN) structure data to the artificial intelligence robot 100 so as to be updated.

Accordingly, the home robot 100 may become smarter and provide a user experience (UX) that evolves as it used.

The home robot 100 and the server 2 may also use external information. For example, the server 2 may comprehensively use external information acquired from other linked service server (not shown) to provide an excellent user experience.

In addition, according to the present invention, the home robot 100 may provide various and active control functions to the user, by actively providing information beforehand or outputting a voice recommending a function or service.

The artificial intelligence home robot 100 may proceed with initial setting, when the user purchases the artificial intelligence home robot 100 and initially turns on a power button. That is, when the power button is turned on, an utterance requesting an initial setting may proceed and, as such initial setting, a network setting, an account setting, a call word setting, and the like may proceed.

In the network setting, the operation of setting the IP of the network set in the current place as the default network of the home robot 100 may be performed. In the account setting, other account which a current user has may be linked, and new account may be created and registered. In addition, a call word, which is an operation word used when calling the home robot 100 or switching modes, may be set. For example, it may be set to a name such as 'hey chloe'.

When such an initial setting is completed, the home robot 100 may stand by in the current place in a state capable of providing various services.

FIG. 2 is a front view showing an outer shape of a home robot 100 that can provide various services to a user.

Referring to FIG. 2, the home robot 100 includes a main body 101, 102 that forms an outer shape and accommodate various components therein.

The main body 101, 102 may include a body 101 forming a space for accommodating various components constituting the home robot 100 and a support portion 102 that is disposed below the body 101 and supports the body 101.

The home robot 100 may include a head 110 disposed above the main body 101, 102. A display 182 for displaying an image may be disposed in the front surface of the head 110.

The display 182 corresponds to a face of the home robot 100 and may express emotions by displaying various expressions. In addition, the home robot 100 may provide various information through the display 100.

In the present specification, the front direction may mean the +y axis direction, and the vertical direction may mean the z axis direction, and the horizontal direction may mean the x axis direction.

The head 110 may rotate within a certain angle range about the x axis.

Accordingly, when viewed from the front, the head 110 is able to perform a nodding operation of moving up and down as if a person nods the head in the vertical direction. For example, the head 110 may perform the original position return operation one or more times, after rotating within a certain range as if a person nods the head in the vertical direction.

Meanwhile, in some embodiments, at least a part of the front surface on which the display 182 of the head 110, which may correspond to the face of a person, is disposed may be implemented to be nodded.

Therefore, although the embodiment in which the entire head 110 moves in the vertical direction is mainly described, unless otherwise described, the nodding operation of the head 110 in the vertical direction may be replaced by a nodding operation of at least a part of the front surface on which the display 182 is disposed, in the vertical direction.

The body 101 may be configured to be rotatable in the horizontal direction. That is, the body 111 may be configured to be rotatable 360 degrees around the z-axis.

In addition, in some embodiments, the body 101 may also be configured to be rotatable within a certain angle range around the x-axis, so that the body 101 can move as if nodding in the vertical direction. In this case, as the body 101 rotates in the vertical direction, the head 110 may also rotate around the axis on which the body 101 rotates.

Meanwhile, the home robot 100 may include an image acquisition unit 120 for photographing a certain range around the main body 101, 102, and at least around the front surface of the main body 101, 102.

The image acquisition unit 120 photographs the surroundings of the main body 101, 102, an external environment, and the like, and may include a camera module. A plurality of cameras may be installed in each part to achieve a photographing efficiency. Preferably, the image acquisition unit 120 may include a front camera provided on the front surface of the head 110 to acquire an image of the front surface of the main body 101, 102.

In addition, the home robot 100 may include a voice input unit 125 for receiving a voice input of a user.

The voice input unit 125 may include a processing unit that converts analog sound into digital data or may be connected to the processing unit to convert a user input voice signal into data so as to be recognized by the server 2 or the controller 140.

The voice input unit 125 may include a plurality of microphones to enhance the accuracy of the reception of user voice input and determine the user's position.

For example, the voice input unit 125 may include at least two microphones.

The plurality of microphones MIC may be disposed to be spaced apart from each other, and may acquire an external audio signal including a voice signal and process the signal into an electrical signal.

Meanwhile, at least two microphones, which are input devices, are required for estimating the direction of a sound source or a user that generates sound. As the microphones are physically farther away from each other, the resolution (angle) of direction detection becomes higher. In some embodiments, two microphones may be disposed in the head 110. In addition, by including two microphones on the rear surface of the head 110, the user's position in the three-dimensional space can be determined.

In addition, a sound output unit 181 may be disposed on the left and right sides of the head 110 to output certain information as sound.

The home robot 100 may further include a light emitting unit 103 along the edge of the support portion 102.

The light emitting unit 103 may be formed to surround the edge of the support portion 102 in a stripe type, and may include a plurality of LEDs as a light source. The light emitting unit 103 may emit light of different colors according to modes and/or conditions, and may emit light in a different light emitting pattern.

As described above, color adjustment or dimming adjustment may be performed to indicate the current emotion and mode of the home robot 100.

Meanwhile, the outer shape and structure of the home robot 100 shown in FIG. 2 is just an example, and the present invention is not limited thereto. For example, unlike the rotation direction of the robot 100 shown in FIG. 2, the entire robot 100 may be tilted in a specific direction or shaken.

Meanwhile, the home robot 100 may include a power supply unit (not shown) connected to an outlet in the home to supply power to the home robot 100.

Alternatively, the home robot 100 may include a power supply unit (not shown), provided with a rechargeable battery (not shown), for supplying power to the home robot 100. In some embodiments, the power supply unit (not shown) may include a wireless power receiver for wirelessly charging the battery.

Meanwhile, referring to FIG. 3, the home robot 110 may include an image acquisition unit 120, and a camera module of the image acquisition unit 120 may include a digital camera. The digital camera may include at least one optical lens, an image sensor (e.g., a CMOS image sensor) configured to include a plurality of photodiodes (e.g., pixels) on which image is focused by the light passed through the optical lens, and a digital signal processor (DSP) that forms an image based on the signal outputted from the photodiodes. The digital signal processor may generate not only a still image but also a moving image composed of frames formed of the still image. The image acquisition unit 120 may photograph the front direction of the home robot 100 and may photograph an image for user recognition.

In addition, the image photographed and acquired by the image acquisition unit 120 may be stored in a storage unit 130.

In addition, the home robot 100 may include a voice input unit 125 for receiving a voice input of a user. The voice input unit 125 may include a processing unit that converts analog sound into digital data, or may be connected to the processing unit to convert a user input voice signal into data so as to be recognized by the server 2 or the controller 140.

At least two microphones are required for estimating the direction of a sound source or a user that generates sound. As the microphones are physically farther away from each other, the resolution (angle) of direction detection becomes higher. In some embodiments, two microphones may be disposed in the head 110.

In addition, the home robot 100 may include a controller 140 for controlling overall operations, a storage unit 130 for storing various data, and a communication unit 190 for transmitting and receiving data with other devices such as the server 2.

In addition, the home robot 100 may further include a driving unit 160 for rotating the head 110 and the body 101.

The driving unit 160 may include a plurality of driving motors (not shown) for rotating and/or moving the body 101 and the head 110.

The controller 140 controls the overall operation of the home robot 100 by controlling the image acquisition unit 120, the driving unit 160, the display 182, the light emitting unit 103, and the like that constitute the home robot 100.

The storage unit 130 records various types of information necessary for the control of the home robot 100, and may include a volatile or nonvolatile recording medium. The recording medium stores data that can be read by a microprocessor, and may include a hard disk drive (HDD), a solid state disk (SSD), a silicon disk drive (SDD), a ROM, a RAM, a CD-ROM, a magnetic Tape, a floppy disk, an optical data storage device, and the like.

In addition, the controller 140 may transmit an operation state of the home robot 100 or a user input to the server 2 through the communication unit 190.

The communication unit 190 includes at least one communication module to allow the home robot 100 to be connected to the Internet or a certain network.

In addition, the communication unit 190 is connected to the communication module provided in a home appliance (not shown) to process data transmission and reception between the home robot 100 and the home appliance (not shown).

Meanwhile, the storage unit 130 may store data for voice recognition, and the controller 140 may process a voice input signal of the user received through the voice input unit 125 and perform a voice recognition process.

The voice recognition process may use various known voice recognition algorithms, and in particular, perform natural language processing (NLP) to accomplish preprocessing such as tokenization from received voice, POS tagging, stopword processing, or the like, so that the exact meaning of the voice data can be found through feature extraction, modeling, and inference based on preprocessed data.

In this case, the controller 140 may perform deep learning algorithm such as RNN and CNN, or may apply various machine learning modeling.

Meanwhile, the controller 140 may control the home robot 100 to perform a certain operation based on the voice recognition result.

For example, when the command included in the voice signal is a command for controlling the operation of a certain home appliance, the controller 140 may control to transmit a control signal based on the command included in the voice signal to the controlled home appliance.

Meanwhile, in some embodiments, the controller 140 may determine whether the user is a registered user by comparing a user image acquired through the image acquisition unit 120 with information previously stored in the storage unit 130. In addition, the controller 140 may control to perform a specific operation only for the voice input of the registered user.

In addition, the controller 140 may identify a user having control authority for the home robot 100 and, when the user having control authority is identified, may control the head 110 to be nodded. Accordingly, the user can intuitively recognize that the home robot 100 has identified a user him/herself.

Meanwhile, the controller 140 may control the body 101 and/or the head 111 to be rotated, based on the user image information acquired through the image acquisition unit 120.

The controller 140 may rotate the body 101 in the horizontal direction, based on the user image information. For example, when the number of faces included in the user image information is one, the body 101 may be rotated in the horizontal direction so that the face included in the user image information is located in the center of the camera of the image acquisition unit 120.

In addition, the controller 140 may control the head 111 to rotate in the vertical direction so that the display 182 is directed to a face included in the user image information. Thus, user can more easily check the information displayed on the display 182.

In addition, there is an advantage in performing a specific operation, such as user identification of the home robot 100, subsequent photographing, etc.

Accordingly, interaction and communication between the user and the home robot 100 can be easily achieved.

Meanwhile, when the number of faces included in the user image information is plural, the controller 140 may control the body 101 of the home robot 100 to rotate so that an average value of a plurality of face positions included in the user image information is located in the center of the camera of the image acquisition unit 120.

Since the home robot 100 is used in a home, a plurality of family members may use the home robot 100 together. In this case, the home robot 100 may not be directed toward any one of the family members, but more naturally toward the average value of the positions of the plurality of users when there is another person adjacent to the speaking user.

In addition, there is an advantage in performing a specific operation, such as identification of a plurality of users, group photograph for a plurality of users such as family members.

Meanwhile, in some embodiments, even if a plurality of users are recognized, it may be set to direct a speaker who uttered a voice.

The controller 140 may control the body 101 to be rotated based on at least one of the number of faces included in the acquired user image information, position information of the face, and area information.

According to the distance between the user and the home robot 100, the face size in the image acquired by the image acquisition unit 120 may vary. Therefore, the home robot 100 may control to face toward the optimized position by considering the area information of the face as well as the number and position of the user included in the image acquired by the image acquisition unit 120.

Meanwhile, the home robot 100 may include an output unit 180 to display certain information as an image or to output as a sound.

The output unit 180 may include a display 182 that displays information corresponding to a user's command input, a processing result corresponding to the user's command input, an operation mode, an operation state, an error state, and the like, as an image.

The display 182 may be disposed in the front surface of the head 110 as described above.

In some embodiments, the display 182 may be configured as a touch screen by forming a mutual layer structure with a touch pad. In this case, the display 182 may be used as an input device for inputting information by a user's touch in addition to an output device. On the display 182, a face of robot shaped as a human face may be displayed, and particularly, eyes of various expressions may be displayed.

In addition, the output unit 180 may further include a sound output unit 181 for outputting an audio signal. The sound output unit 181 may be configured to output a notification message such as a warning sound, an operation mode, an operation state, an error state, information corresponding to user's command input, a processing result corresponding to user's command input, and the like, as a sound, under the control of the controller 140. The sound output unit 181 may convert an electrical signal from the controller 140 into an audio signal and output the audio signal. To this end, a speaker or the like may be provided.

Referring to FIG. 2, the sound output unit 181 may be disposed on in the left and right sides of the head 110 to output certain information as a sound.

Meanwhile, the outer shape and structure of the home robot shown in FIG. 2 is just an example, and the present invention is not limited thereto. For example, the position, number, and the like of the voice input unit 125, the image acquisition unit 120, the sound output unit 181, and the light emitting unit 103 may vary according to design specifications, and the direction and angle of rotation of each component may also vary.

The controller 140 may combine user's voice signal or detection signal for surrounding environment to perform a condition determination on the current state, and perform an operation corresponding to a mode of corresponding condition.

The controller 140 may store scenario for each mode as a program, and transmit or show an operation of corresponding mode to user according to the scenario.

Figure 4:
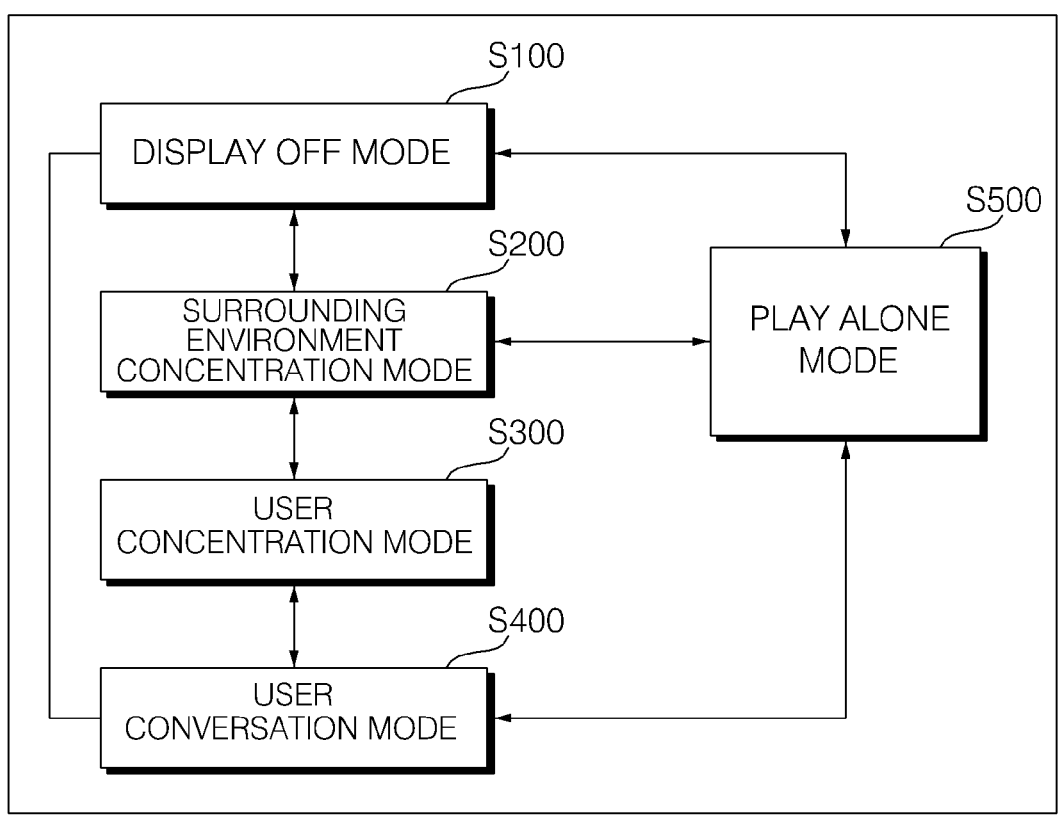
FIG. 4 is a configuration diagram for each mode of a home robot according to an embodiment of the present invention.

FIG. 4 illustrates various modes stored in the controller 140.

The controller 140 of the home robot 100 may include at least five state modes. For example, it may include a display off (or first) mode (S100), a surrounding environment concentration (or second) mode (S200), a user concentration (or third) mode (S300), a user conversation (or fourth) mode (S400), and a play alone (or fifth) mode (S500).

The display off mode (S100) is a mode in which the display 182 of the home robot 100 maintains a turn off state. In the display off mode (S100), power is not applied to the display 182 and the turn-off state of the screen is maintained. However, in the display off mode (S100), although the turn-off state of the screen is maintained, the voice input unit 125 maintains the turn-on state so that the external voice can be recognized.

The surrounding environment concentration mode (S200) is a mode in which a basic expression of the home robot 100 is maintained and an ambient sound is detected, and the basic expression of the robot is displayed in the display 182.

In the surrounding environment concentration mode (S200), the display 182 may be turned on to display the basic expression, additional information may be displayed, and a state in which an emotion expression can be accomplished may be maintained.

In addition, both the microphone of the voice input unit 125 and the camera of the image acquisition unit 120 maintain the turn-on state.

Thus, the state of the surrounding environment may be recognized visually and audibly, and may respond accordingly. For example, the home robot 100 can rotate in a corresponding direction when a sound is recognized, and enter the user concentration mode (S300) when a call word is recognized from the surrounding environment. In addition, when a person is recognized from the image data secured by the camera, the home robot 100 enters the user concentration mode (S300) and follows a user.

Further, the display 182 can be operated by touching the display 182, and the home robot 100 may utter by some functions.

The user concentration mode (S300) is a mode for expressing emotion, and the display 182 maintains the turn-on state and maintains the basic expression.

The user concentration mode (S300) is a mode that is switched, when a user is recognized in the surrounding environment concentration mode (S200), or when a physical stimulation, for example, a touch on the display 182 is introduced from the outside, and information may be acquired from a recognized person, and accordingly, various information can be provided and emotions can be expressed.

In the user concentration mode (S300), both the microphone of the voice input unit 125 and the camera of the image acquisition unit 120 maintain the turn-on state to observe the user's reaction and prepare for a corresponding reaction. That is, it is a preparation mode in which an eye contact is performed while following a corresponding user, as a state of concentrating on the detected user, before talking to the user according to the utterance from the user.

When the display 182 is turned on to express information/emotion with various expressions, and other user is detected through the camera, the user concentration mode (S300) is maintained while following a new user. The user concentration mode (S300) is changed again to the surrounding environment concentration mode (S200) when the user is no longer detected.

The user conversation mode (S400) is a mode of directly talking with the user. Both the microphone of the voice input unit 125 and the camera of the image acquisition unit 120 maintain the turn-on state so that the display 182 also maintains the turn-on state to express information/emotion. The home robot 100 may perform various utterances according to a user's command in the user conversation mode (S400), and may display various expressions according to the utterance. That is, the combination of the display 182, the operation, and the light emitting unit 103 may express a specific expression and emotion.

The user conversation mode (S400) is entered by a call word or a command, and the home robot 100 may be connected to the server 2 to read and provide various information to the user. In particular, it can provide various services that can be provided by the home robot 100 by connecting to the server 2, and such services can be provided to the user through the display 182 and the sound output unit 181. For example, various information, such as weather, traffic, music, shopping, news, may be provided to the user, and a daily conversation (interaction) may be performed.

Meanwhile, the service connected to the server 2 may be terminated by pressing an end button formed in a button area of the home robot 100.

The play alone mode (S500) is a standby mode, and means a standby state before entering the display off mode (S100) when there is no stimulus, utterance, movement recognition, etc. for a certain time during the surrounding environment concentration mode (S200), the user concentration mode (S300), and the user conversation mode (S400).

The home robot 100 may pass through the play alone mode (S500) for a certain time before the display off mode (S100), and in this case, various motions may be provided to draw the user's attention.

The home robot 100 may randomly select and operate various motions, and may continuously operate and maintain a plurality of motions for a certain time, e.g., 2 minutes, preferably, within 1 minute, and then enter the display off mode (S100).

Various motions of the home robot 100 in the play alone mode (S500) may form a scenario by combining the expression and the rotation of the display unit 182, and the light emitting of the light emitting unit 103 and the utterance.

If there is no stimulus for a certain time through the play alone mode (S500), it enters the display off mode (S100) to remind the user of the home robot 100 and recommend to use once again.

The controller 140 of the home robot 100 may select and enter various modes according to condition and may operate according to a scenario, thereby providing a quick, friendly and optimal response to the user. In addition, power consumption can be reduced by controlling the on/off of specific module according to the condition.

Hereinafter, the operation of the home robot of the present invention will be described with reference to FIGS. 5 to 10.

Figure 5:
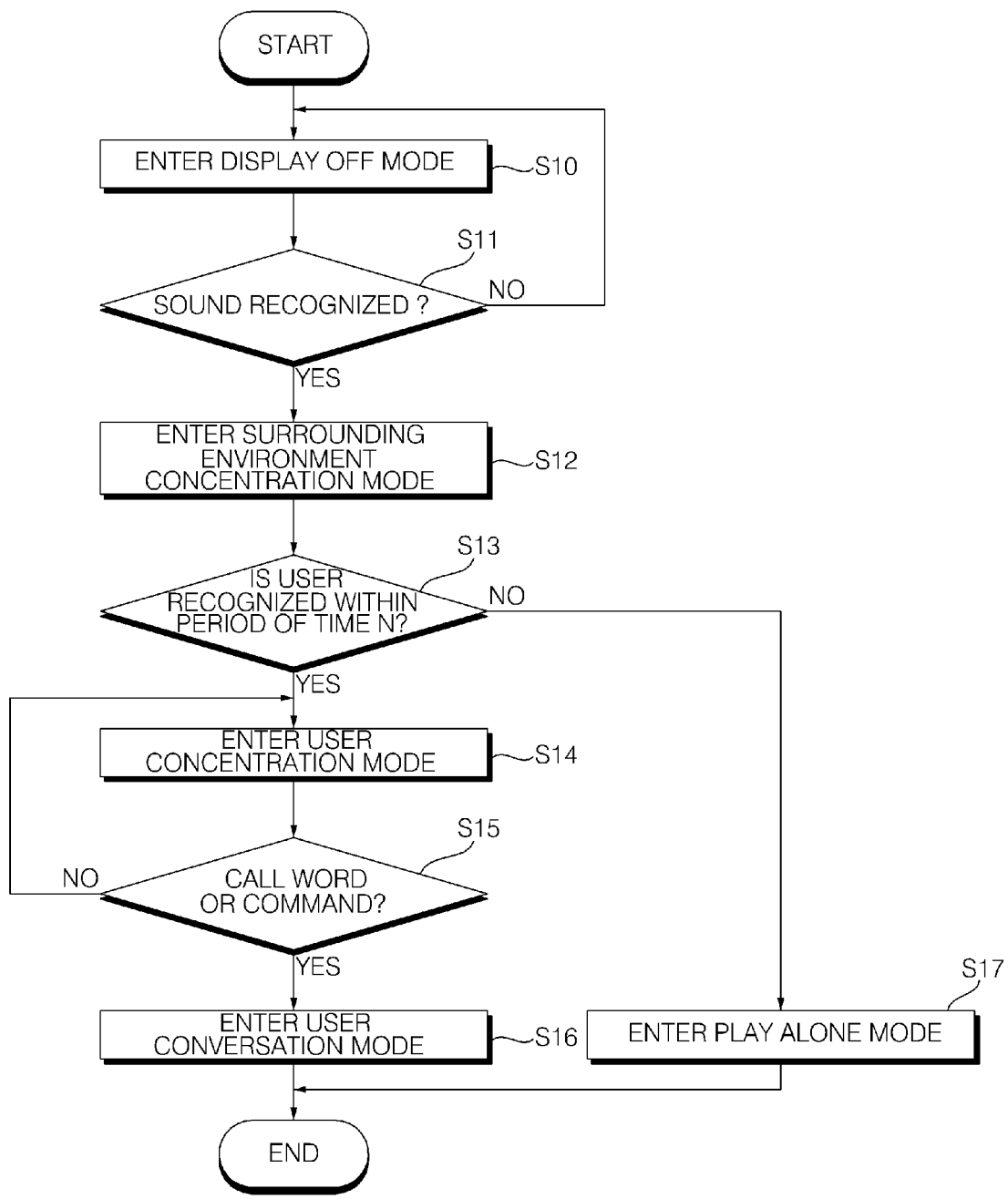
FIG. 5 is a flowchart illustrating a control method of a home robot according to an embodiment of the present invention.
Figure 6:
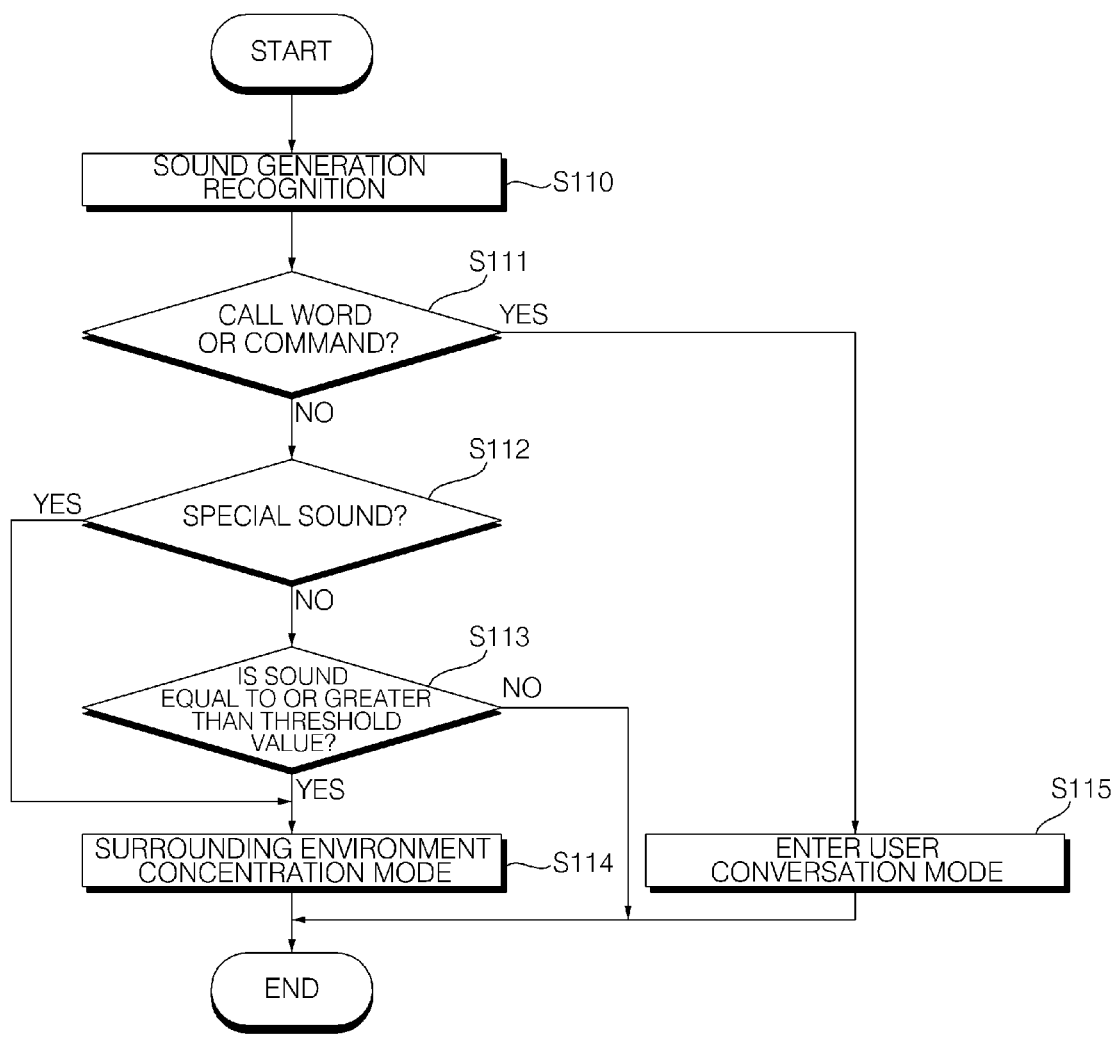
FIG. 6 is a flowchart illustrating a control method of a home robot which shows a specific step of FIG. 5 in detail.
Figure 7:
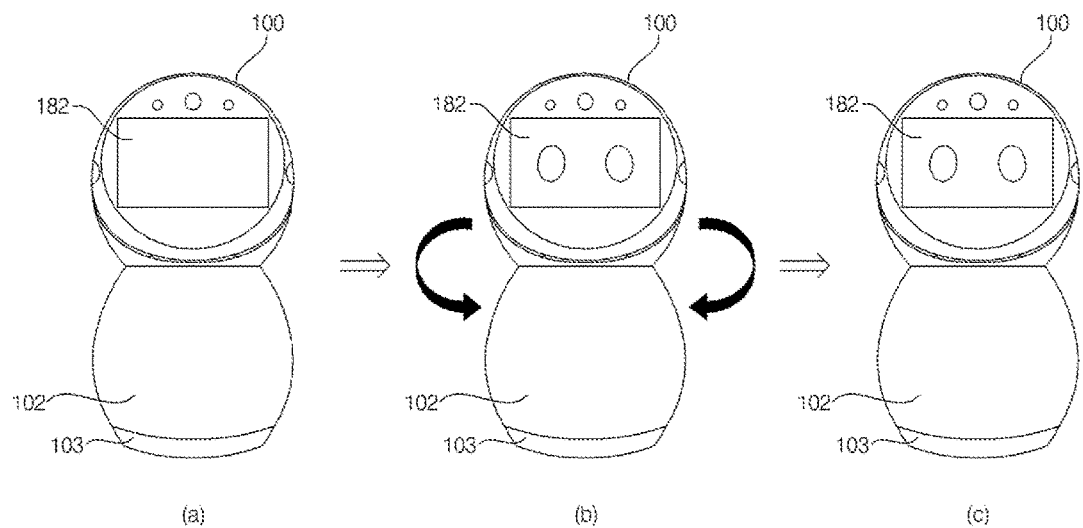
FIGS. 7 to 10 are state diagrams illustrating a specific step of FIG. 5.
Figure 8:
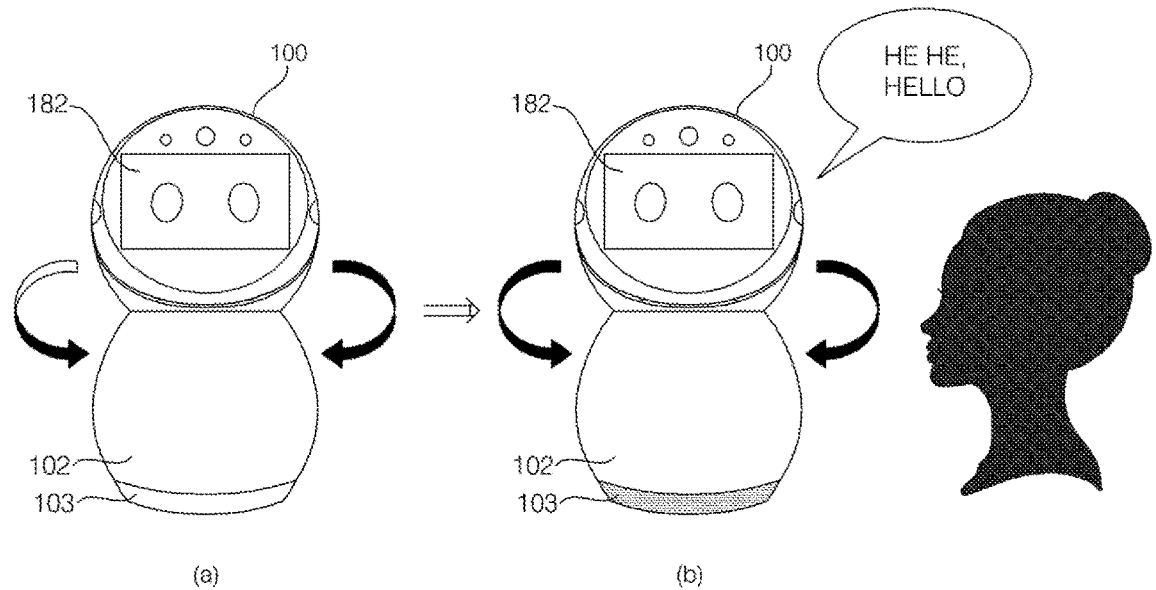
Figure 9:
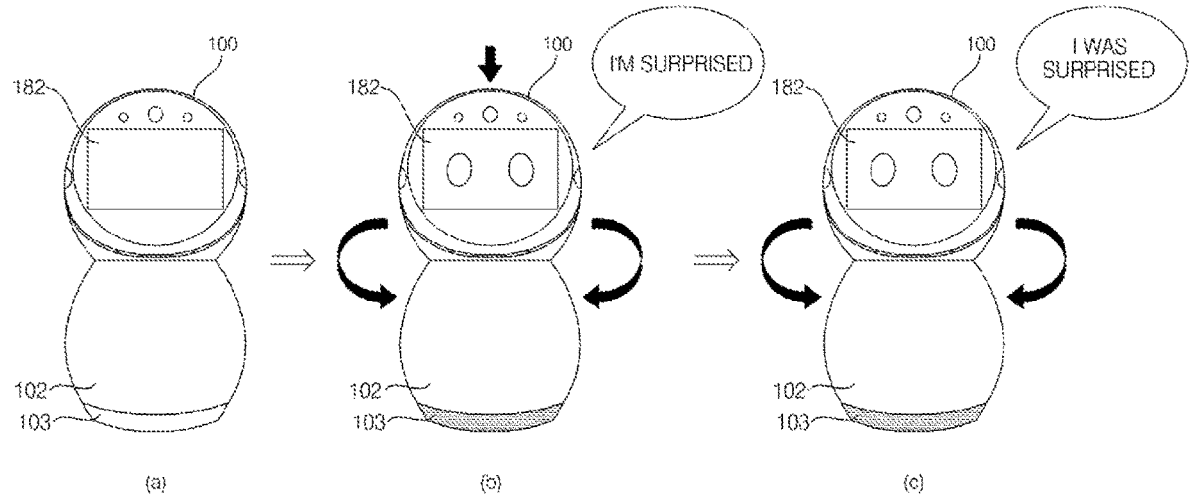
Figure 10:
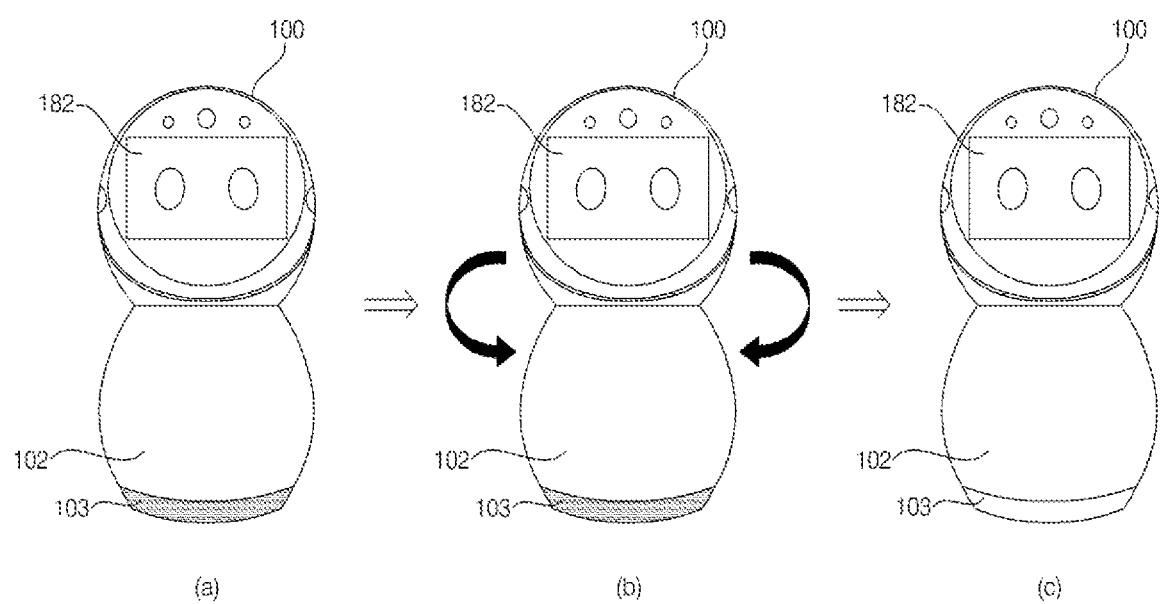

FIG. 5 is a flowchart illustrating a control method of a home robot according to an embodiment of the present invention, FIG. 6 is a flowchart illustrating a control method of a home robot which shows a specific step of FIG. 5 in detail, and FIGS. 7 to 10 are state diagrams illustrating a specific step of FIG. 5.

First, a schematic mode switching operation will be described with reference to FIG. 5.

In a state where there is no stimulus in the home robot 100, when the operation is performed in the display off mode (S10), the display 182 of the home robot 100 is in a turn-off state as shown in FIG. 7A according to the display off mode (S10). In this state, the microphone of the voice input unit 125 is maintained in a turn-on state and stands by in a power saving mode.

At this time, when the home robot 100 recognizes a sound from the surrounding environment (S11), it reads the recognized sound to read information contained in a corresponding sound, and is switched to other mode according to the information contained in the sound.

In this case, the controller 140 performs preprocessing for sound recognition.

The preprocessing may filter a corresponding utterance data by performing a tokenization, POS tagging, stopword processing from the utterance of received security code by performing a natural language processing (NLP) algorithm.

Next, the controller 140 analyzes the exact intention of the utterance data through feature extraction, modeling, and inference from the preprocessed utterance data by performing sound recognition intention analysis.

In addition, the controller 140 may perform deep learning algorithm such as RNN, CNN, or may apply various machine learning modeling to analyze the exact intention of the utterance data.

In this case, the matching of the utterance data with the stored data may be determined to be equal when the coidentity satisfies 80% or more, preferably 90% or more, in addition to the case where the coidentity satisfies 100%.

For example, when a random sound is recognized, the home robot 100 turns on the camera and turns on the display 182 to be in a state as shown in FIG. 7B. At this time, it tracks in the direction in which the sound is generated as shown in FIG. 7B. If there is no recognition of person within a certain time, it enters the surrounding environment concentration mode (S200) of FIG. 7C (S12), and proceeds with operation according to the scenario of the surrounding environment concentration mode (S200). That is, in the surrounding environment concentration mode (S200), panning may be maintained in the direction in which the sound is generated, while an expression indicating a calm feeling may be maintained on the display 182. At this time, the light emitting unit 103 may maintain a turn-off state, and no separate utterance occurs.

Meanwhile, the controller 140 determines whether the user is recognized within a period of time n (S13), and in this case, the period of time n may be 5 seconds, preferably 3 seconds or less. In the surrounding environment concentration mode (S200) as shown in FIG. 8A, the microphone of the voice input unit 125 and the camera of the image acquisition unit 120 are turned on, and image data may be acquired from the camera to determine whether the user is recognized from the image data. In addition, it may be determined that the user is recognized by reading whether there is a physical stimulus on the surface of the home robot 100. If it is determined that the user is recognized within the period of time n, it is switched to the user concentration mode (S300) (S14). In the user concentration mode (S300), a smiling expression may be displayed on the display 182 as shown in FIG. 8B, and the light emitting unit 103 may perform a light emitting control of repeating the flickering of a first color at a slow speed. In addition, it is possible to track the found user, and to perform various reactions that generally express pleasant feelings by performing greeting utterance such as 'He He, Hello' by the speaker. In the user concentration mode (S300), it may directly interact with the user by taking an appropriate reaction according to the user's reaction after the utterance.

Meanwhile, if the user is not recognized within the period of time n, it enters the display off mode (S100) again after passing through the play alone mode (S500) (S17).

Meanwhile, when switching to the user concentration mode (S300), it may follow the user while fixing the gaze to the recognized user. At this time, when the call word or command is recognized within a certain time (S15), it enters the user conversation mode (S400) (S16) and operates according to the scenario of the user conversation mode (S400).

In this case, the call word may be, for example, a sound calling a name such as 'Hi, Chloe', 'Hey, Chloe', hello, Chloe', or the like. The command may be a sound for requesting a specific action. For example, it may be a clear request such as 'Turn on music', 'Tell me the weather', Guide me'.

As described above, it may enter a corresponding mode according to the sound or the image received in the display off mode (S100), and turn the module on and off according to the scenario to control the operation.

Specifically, it will be described with reference to FIG. 6 that it may enter a different mode according to the recognized sound.

In the display off mode (S100), the home robot 100 acquires the sound recognized from the surrounding environment in a state where only the speaker is turned on without movement while the display 182 is turned off as shown in FIG. 9A (S110).

At this time, when it is recognized that the sound is generated from the surrounding environment, it is determined whether corresponding sound is a call word or a command (S111), and if the corresponding sound is a call word or a command, it enters the user conversation mode (S400) as shown in FIG. 5 and proceed with the operation.

Meanwhile, if corresponding sound is not a call word or a command, the home robot 100 determines whether the corresponding sound is a special sound (S112).

The special sound is a preset sound, and may be a preset sound generated in a specific situation such as a siren, a baby cry, a door closing sound, a cracking sound, and the like. When the corresponding sound is a special sound, the home robot 100 may enter the surrounding environment concentration mode (S200) and may react as shown in FIG. 9B (S114).

That is, the light emitting unit 103 may be controlled to repeat the slow flickering of the first color, while the display 182 is turned on to display an embarrassed expression, and the tracking may be performed in the direction in which the corresponding sound is generated. In addition, the speaker can perform utterances such as 'I'm surprised'

Meanwhile, if it is not a preset special sound, it may be determined whether the corresponding sound is a sound of a threshold value or more (S113). In this case, when the corresponding sound is a loud sound greater than or equal to the threshold value, it may enter the surrounding environment concentration mode (S200) like the special sound and may react in the same manner (S114).

Thereafter, when the user is recognized as shown in FIG. 5, it may enter the user concentration mode (S300). In this case, in the user concentration mode (S300), utterance may be performed such as 'Are you okay?', 'I was surprised', 'The baby crying', and 'Uzzuzzu Uzzuzzu', according to the corresponding sound as shown in FIG. 9C.

The operation of the other module is the same as the scenario in the user concentration mode (S300) described above.

When the user is not recognized by searching in the direction in which sound is generated as shown in FIG. 10B in the surrounding environment concentration mode (S200) of FIG. 10A, the display 182 maintains the basic expression in the surrounding environment concentration mode S200 as shown in FIG. 10C, it may enter the play alone mode (S500) after maintaining a certain time without the operation of the light emitting unit 103, the operation, the speaker, etc.

Figure 11:
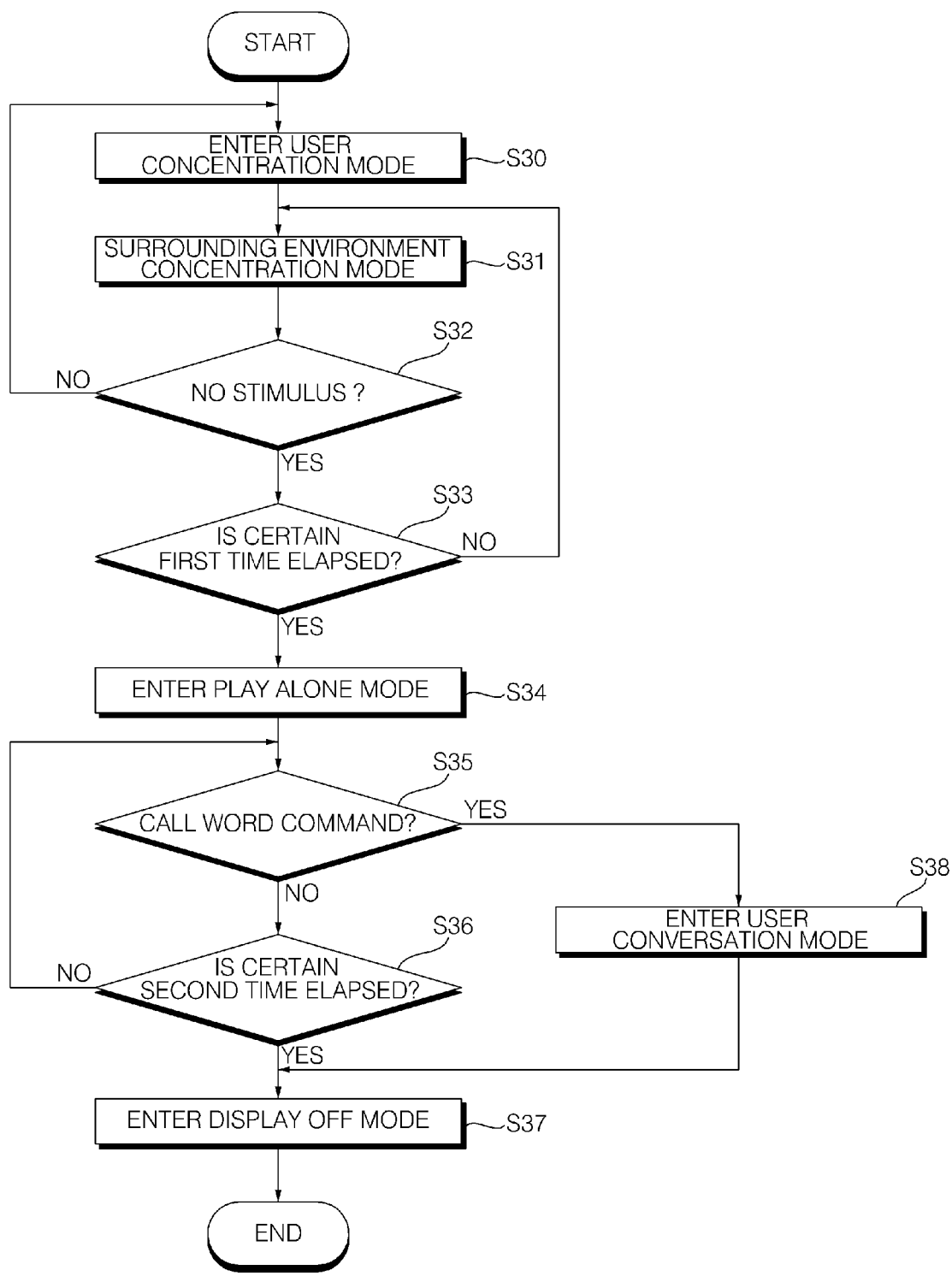
FIG. 11 is a flowchart illustrating a control method of a home robot according to another embodiment of the present invention.
Figure 12:
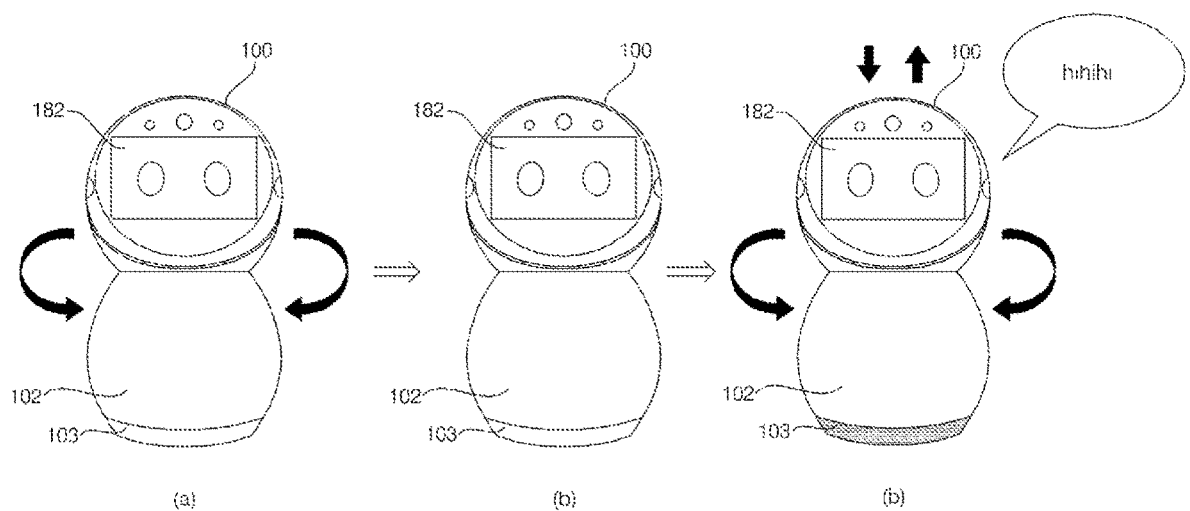
FIG. 12 is various state diagrams showing a specific step of FIG. 11.

Hereinafter, the operation of entering the play alone mode (S500) of the present invention will be described with reference to FIGS. 11 to 12.

As described above, when it enters (S30) the user concentration mode (S300) as shown in FIG. 12A and performs an operation and then the user disappears, or when there is no stimulus for a certain time, e.g., 5 minutes, preferably 3 minutes, the home robot 100 is switched again to the surrounding environment concentration mode as shown in FIG. 12B (S31).

At this time, the operation of tracking the user is stopped, and various modules do not operate to express a calm feeling. In addition, it is determined that there is no special stimulus in the surrounding environment concentration mode (S200) (S32), when a certain first time, preferably, 3 minutes is elapsed in such a state (S33), it enters the play alone mode (S500).

At this time, when the external stimulus is acquired, or when the user is recognized again, it may be switched again to the user concentration mode (S300).

When entering the play alone mode (S500) as shown in FIG. 12C (S34), the display 182 may display a smiling expression in order to express a pleasant emotion, and the light emitting unit 103 may repeat the slow flickering of the first color. In addition, it may utter laughter sounds such as 'HiHiHi', 'HeHeHe', and may perform expressions such as movement, rotation, and shaking to express pleasure.

In the play alone mode (S500), various operations may be continuously performed, and the play alone mode (S500) may be maintained for a certain second time (S36).

When the call word or command is acquired for the certain second time (S35), as described above, it may enter the user conversation mode (S400), and when entering the user conversation mode (S400), interaction with the user may be performed.

In addition, when the certain second time elapses without inputting the call word command, all of the modules excluding the voice input unit 125 may be turned off as it enters the display off mode.

At this time, when entering the play alone mode (S500) in the surrounding environment concentration mode, when the current time is a night time, or the illumination value of the surrounding environment is less than or equal to a certain value, it may enter directly to the display off mode without passing through the play alone mode (S500).

Meanwhile, when a random sound is recognized, the home robot 100 turns on the camera and turns on the display 182 to maintain the state of FIG. 7B. At this time, while tracking in the direction in which the sound is generated as shown in FIG. 7B, if there is no person recognition within a certain time, it enters the surrounding environment concentration mode (S200) of FIG. 7C, and the operation is performed according to the scenario of the surrounding environment concentration mode (S200). That is, in the surrounding environment concentration mode (S200), panning may be maintained in the direction in which the sound is generated, while an expression indicating a calm feeling may be maintained on the display 182.

At this time, the light emitting unit 103 may maintain a turn-off state, and no separate utterance occurs.

Meanwhile, it is determined whether the user is recognized within a period of time n, and in this case, the period of time n may be a time within 5 seconds, preferably 3 seconds. In the surrounding environment concentration mode (S200) as shown in FIG. 8B, the microphone of the voice input unit 125 and the camera of the image acquisition unit 120 are turned on, and the image data may be acquired from the camera to determine whether the user is recognized from the image data. In addition, it may be determined whether the user is recognized by reading whether there is a physical stimulus on the surface of the home robot 100. If it is determined that the user is recognized within the certain first time, it is switched to the user concentration mode (S300). In the user concentration mode (S300), a smiling expression may be displayed on the display 182 as shown in FIG. 8C, and the light emitting unit 103 may perform the light emitting control of repeating the slow flickering of the first color. In addition, the found user may be tracked, and various reactions that generally express pleasure feelings by performing greeting utterance such as 'He He, hello' by the speaker. In the user concentration mode (S300), it may directly interact with the user by taking an appropriate reaction according to the user's reaction after the utterance.

Meanwhile, if the user is not recognized within the certain first time, it enters the display off mode (S100) again after passing through the play alone mode (S500).

Meanwhile, when switching to the user concentration mode (S300), it may follow the user while fixing the gaze to the recognized user. At this time, if a call word or a command is recognized within a certain time, it enters the user conversation mode (S400) and operates according to the scenario of the user conversation mode (S400).

In this case, the call word may be, e.g., a sound calling a name such as 'Hi, Chloe', 'Hey, Chloe', 'Hello, Chloe', or the like. The command may be a sound for requesting a specific action, and may be a clear request such as 'Play music', 'Tell me the weather', or 'Tell me the way'

As described above, it may enter the corresponding mode according to the sound or the image received in the display off mode (S100), and turn the module on and off according to the scenario to control the operation.

Hereinafter, the operation of the home robot 100 from the play alone mode (S500) to the display off mode (S100) will be described.

Figure 13:
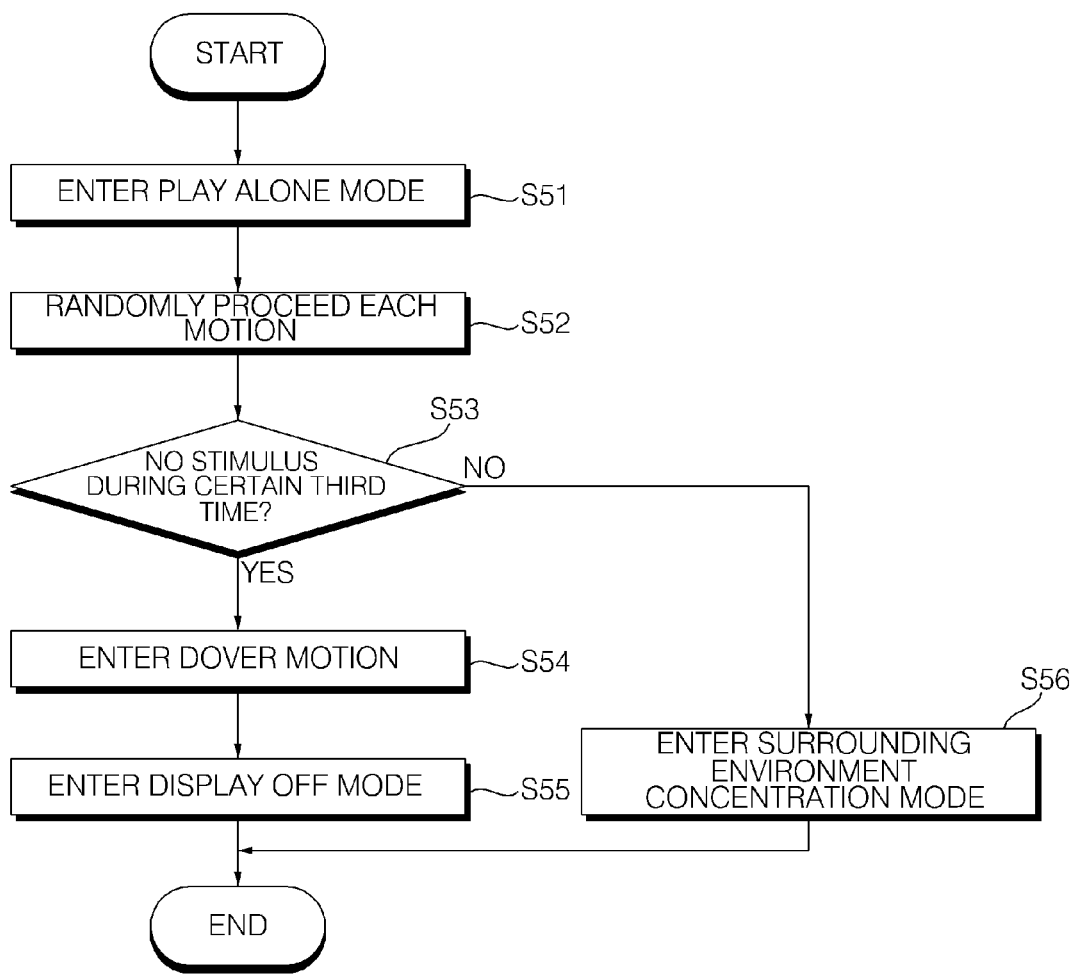
FIG. 13 is a flowchart illustrating a control method of a home robot according to another embodiment of the present invention.
Figure 14:
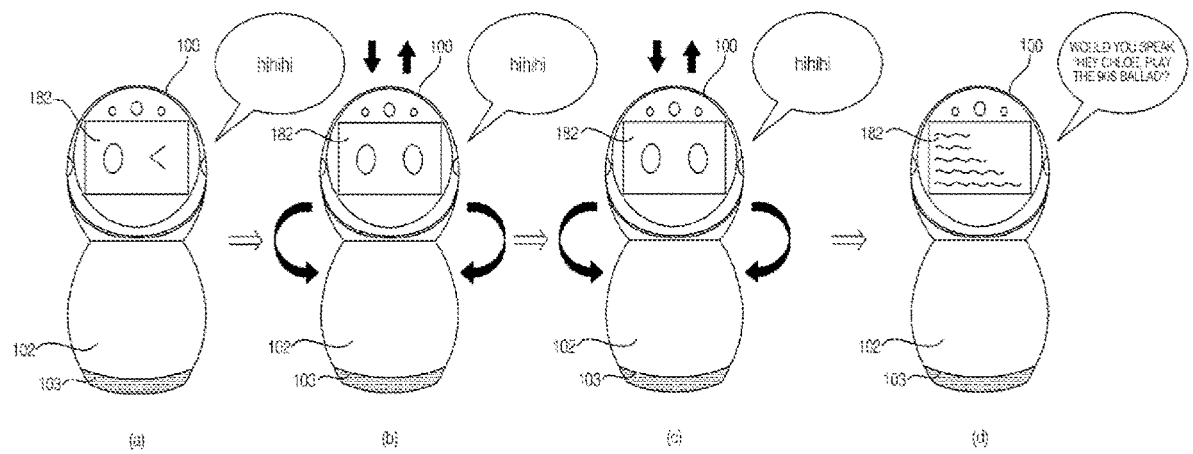
FIGS. 14 and 15 are various state diagrams illustrating a specific step of FIG. 13.
Figure 15:
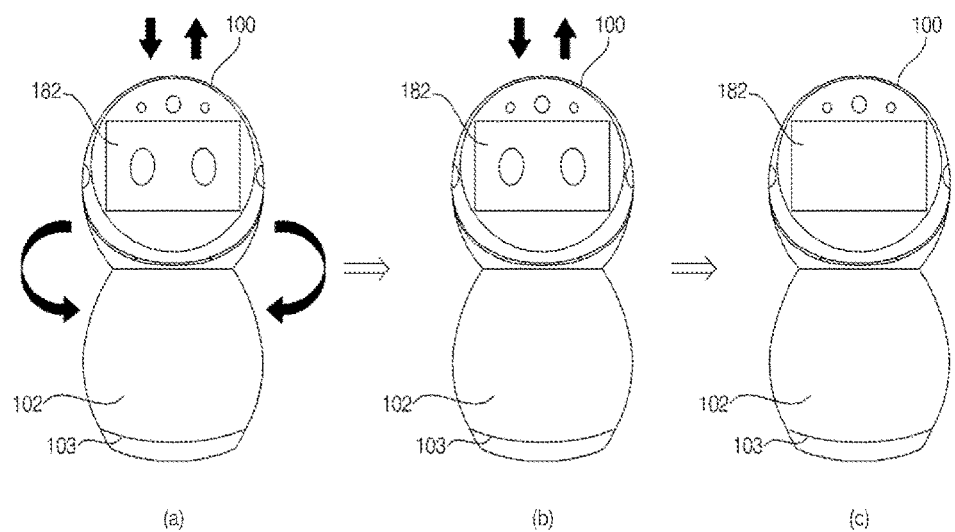

FIG. 13 is a flowchart illustrating a control method of a home robot according to another embodiment of the present invention, and FIGS. 14 and 15 are various state diagrams illustrating a specific step of FIG. 13.

When the home robot 100 enters the play alone mode (S500) (S51), the home robot 100 may randomly select and proceed with a plurality of motions for a certain third time (S52).

In the play alone mode (S500), all of the display 182, the light emitting unit 103, the operation, and the speaker maintain the turn-on state, and may perform a specific operation set according to the motion.

In this case, as a motion, in order to express the satisfied expression as shown in FIG. 14A, the display 182 may display a wink expression, and the light emitting unit 103 may repeatedly express a slow flickering of the first color, and may utter 'HiHiHi' without motion. Alternatively, as shown in FIG. 14B, the display 182 may express a laughter two-stage heart so as to indicate a loving emotion, and the light emitting unit 103 may repeatedly express a slow blink of the first color, and the motion may be accomplished in such a manner that it is shaken back and forth or left and right, and 'HiHiHi' may be uttered.

Alternatively, as shown in FIG. 14C, the display 182 may express the basic stage of laughter to express the pleasant emotion, and the light emitting unit 103 may repeatedly express the slow flickering of the first color, and the motion may be accomplished in such a manner that it is shaken back and forth or left and right, and 'HiHiHi' may be uttered.

Alternatively, a home robot 100 usage guide may be provided as shown in FIG. 14D. That is, the display 182 may display the home robot 100 usage guide, and the light emitting unit 103 may repeatedly express the slow flickering of the first color, and may utter 'Would you speak "Hey Chloe, play the 90s ballad"' and so forth without a motion.

As shown in FIG. 15A, when various motions are randomly selected and proceed for the certain third time and there is no stimulus from the outside during the certain third time (S53), it may enter a dozing motion of FIG. 15B (S54). The certain third time may preferably be 3 minutes, more preferably 1 minute, and the dozing motion may be maintained for a certain time.

At this time, the dozing motion is to display a boring emotion as shown in FIG. 15B, and indicates a motion of tilting back and forth and dozing without the light emitting unit 103 and the sound while the display 182 displays a boring expression.

After such a dozing mode is maintained for about 1 minute, it enters the display off mode (S100) as shown in FIG. 15C (S55).

At this time, all modules excluding the microphone may be maintained turned off.

The home robot 100 according to the present invention is not limited to the configuration and method of the embodiments described above, but the above embodiments may be configured by selectively combining all or some of the embodiments so that various modifications can be achieved.

Meanwhile, the home robot 100 and the operation method of the smart home system including the same according to the embodiment of the present invention can be implemented as a code readable by a processor on a recording medium readable by the processor. The processor-readable recording medium includes all kinds of recording apparatuses in which data that can be read by the processor is stored. Examples of the recording medium that can be read by the processor include a ROM, a RAM, a CD-ROM, a magnetic tape, a floppy disk, an optical data storage apparatus, and the like, and may also be implemented in the form of a carrier wave such as transmission over the Internet. In addition, the processor-readable recording medium may be distributed over network-connected computer systems so that code readable by the processor in a distributed fashion can be stored and executed.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

| Description of the reference numeral | |
|---|---|
| Server 2 | Display 182 |
| Home robot 100 | Sound output unit 181 |
| Light emitting unit 103 | Controller 140 |

The invention claimed is:

1. A method of controlling a robot, the method comprising:
    switching the robot from a display off mode in which a display is deactivated to a surrounding environment concentration mode when a first prescribed sound is detected during the display off mode, wherein the robot searches for a user in a surrounding environment during the surrounding environment concentration mode;
    switching the robot to a user concentration mode when the user is located in the surrounding environment during the surrounding environment concentration mode, wherein the display remains turned on during the user concentration mode;
    switching the robot to a user conversation mode when a second prescribed sound is received from the user during the user concentration mode, wherein the robot provides at least one of an audio output or a visual output to converse with the user during the user conversation mode;
    switching the robot to a play alone mode when the user is not located in the surrounding environment during the surrounding environment concentration mode, wherein the robot continues to search for the user and the display remains turned on during the play alone mode; and
    switching the robot back to the display off mode from the play alone mode, when the user is not located in the surrounding environment after a predetermined time has passed during the play alone mode.

2. The method of claim 1, wherein, when the robot is in the display off mode, an audio sensor is activated to detect the first prescribed sound.

3. The method of claim 2, wherein, when the robot is in the surrounding environment concentration mode, the display, the audio sensor, and an image sensor are activated to search for the user in the surrounding environment.

4. The method of claim 3, further comprising switching to the user conversation mode when the user is recognized in an image captured by the image sensor or the user applies a physical stimulus to the robot.

5. The method of claim 4, wherein the second prescribed sound that triggers the robot to enter the user conversation mode includes at least one of a call word or a command for the robot.

6. The method of claim 1, wherein, in the play alone mode, the robot randomly performs one or more of a plurality of motions.

7. The method of claim 1, wherein, in the play alone mode, the robot expresses one or more emotions by combining one or more of outputting visual content by the display, outputting audio content, performing a motion, and or emitting light.

8. The method of claim 1, wherein the robot performs actions associated with a bored emotion for a prescribed period time when switching between the play alone mode and the display off mode.

9. The method of claim 1, further comprising, when no stimulus is received for a certain time in the surrounding environment concentration mode and an illuminance of the surrounding environment is equal to or less than a threshold value, switching the robot directly from the surrounding environment concentration mode back to the display off mode without the robot entering the play alone mode.

10. The method of claim 1, further comprising:
selectively switching the robot from the display off mode to one of the surrounding environment concentration mode or the user conversation mode according to a received sound type.

11. A robot comprising:
a body;
a head positioned above the body;
a display positioned in a front surface of the head;
a speaker;
one or more microphones; and
a controller configured to:
switch the robot from a display off mode to a surrounding environment concentration mode or a user conversation mode according to a sound received via the one or more microphones, wherein the display is deactivated during the display off mode, the robot searches for a user in a surrounding environment during the surrounding environment concentration mode, and at least one of the speaker or the display maintain to turn on to communicate with the user during the user conversation mode,
switch from the surrounding environment concentration mode to the third mode when the user is located,
enter a play alone mode when the user is not located in the surrounding environment during the surrounding environment concentration mode, wherein the robot continues to search for the user and the display remains to turn on during the play alone mode, and
switch back to the display off mode from play alone mode when the user is not located during the play alone mode.

12. The robot of claim 11, wherein, in the display off mode, the controller turns on at least one of the microphones and deactivates the display and the speaker.

13. The robot of claim 12, wherein, when in the surrounding environment concentration mode, the controller turns on the display, the one or more microphones, and an image sensor to search for the user in the surrounding environment.

14. The robot of claim 11, wherein the controller switches the robot to the user conversation mode from the surrounding environment concentration mode when the user is recognized in an image captured by the image sensor or the user applies a physical stimulus to the robot.

15. The robot of claim 11, wherein the controller switches the robot to the user conversation mode when a call word or a command for the robot is received.

16. The robot of claim 11, wherein, in the play alone mode, the controller causes the robot to randomly perform one or more of a plurality of motions.

17. The robot of claim 11, wherein, in the play alone mode, the controller causes the robot to express one or more emotions by causing at least one of the display to output visual content, the speaker to output audio content, the robot to perform a motion, or the robot to emit light.

18. The robot of claim 17, wherein the controller causes the robot to express a bored emotion when switching between the play alone mode and the display off mode.

19. The robot of claim 11, wherein, when no stimulus detected or received for a certain time in the surrounding environment concentration mode and an illuminance of the surrounding environment is equal to or less than a threshold value, the controller switches the robot to the display off mode.

20. The robot of claim 11, wherein, the controller further causes the robot to selectively switch from the display off mode to one of the surrounding environment concentration mode or the user conversation mode according to a sound type received by one or more of the microphones.

* * * * *